United States Patent
Chen et al.

(10) Patent No.: US 8,062,165 B2
(45) Date of Patent: Nov. 22, 2011

(54) BEARING ASSEMBLY FOR PLANETARY GEAR PINION

(75) Inventors: Joseph Young-Long Chen, Ann Arbor, MI (US); Jack M Gayney, Woodhaven, MI (US); Angela P Willis, Willis, MI (US); Hun J Kim, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 421 days.

(21) Appl. No.: 12/020,309

(22) Filed: Jan. 25, 2008

(65) Prior Publication Data

US 2009/0190870 A1   Jul. 30, 2009

(51) Int. Cl.
*F16H 57/08* (2006.01)

(52) U.S. Cl. ....................................................... 475/331

(58) Field of Classification Search .................. 475/331, 475/348; 384/100, 107, 112, 121, 248, 420, 384/568, 569, 126, 127, 368

See application file for complete search history.

(56) References Cited

U.S. PATENT DOCUMENTS

| 1,700,856 | A | * | 2/1929 | Schein | 384/368 |
| 2,703,264 | A | * | 3/1955 | Pitner | 92/187 |
| 3,316,035 | A | * | 4/1967 | Zuber | 384/127 |
| 4,772,188 | A | * | 9/1988 | Kimura et al. | 418/55.6 |
| 4,917,509 | A | * | 4/1990 | Takano | 384/275 |
| 5,219,232 | A | * | 6/1993 | Adams et al. | 384/275 |
| 5,368,528 | A | * | 11/1994 | Farrell | 475/348 |
| 7,448,980 | B2 | * | 11/2008 | Abarquez et al. | 475/348 |
| 2004/0105601 | A1 | * | 6/2004 | Honda et al. | 384/368 |
| 2005/0209039 | A1 | * | 9/2005 | Kempf | 475/159 |

FOREIGN PATENT DOCUMENTS

JP        03014947 A  *  1/1991 ............ 475/344

* cited by examiner

*Primary Examiner* — Justin Holmes

(57) ABSTRACT

An outer needle bearing race and thrust washer assembly provides improved lubrication for a pinion gear of a planetary gear assembly. The bearing race and thrust washer assembly are used in pairs with the bearing races disposed within the planet or pinion gear and the thrust washers disposed adjacent the end faces of the planet or pinion gear. Each assembly includes a cylindrical bearing portion having a crowned, i.e., convex, inner surface which is secured at one end to a thrust washer. The outside face of the washer includes a plurality of shallow radial channels or grooves. A plurality of oil passageways extend from the grooved surface of the washer to its opposite surface inside the cylindrical bearing portion.

20 Claims, 3 Drawing Sheets

U.S. 8,062,165 B2

BEARING ASSEMBLY FOR PLANETARY GEAR PINION

FIELD

The present disclosure relates to a bearing assembly for a pinion gear of a planetary gear assembly and more particularly to an outer race bearing and thrust washer assembly for a pinion or planet gear of a planetary gear assembly.

BACKGROUND

The statements in this section merely provide background information related to the present disclosure and may or may not constitute prior art.

Planetary gear assemblies are a mainstay of many mechanical power transmission devices. Such devices include a centrally disposed sun gear, a planet gear carrier disposed about the sun gear which rotatably supports a plurality, typically three or four, planet gears and an outer ring gear. The planet gears are in constant mesh with both the sun gear and the ring gear. Depending upon what elements are driven and held stationary as well as the number of teeth on the various gears, an extraordinary number of gear ratios can be achieved by these devices, In many applications such as motor vehicle automatic transmissions, multiple planetary gear assemblies are utilized to provide multiple, sequenced gear ratios which complement the power and torque outputs of the motor and provide exceptional performance and fuel economy.

In some multiple planetary gear assembly automatic transmissions, the nominal operating speed of certain planet or pinion gears can be quite high. High operating speeds can have an effect on reliability and service life. A second factor affecting reliability and service life is the load, torque or overall power, i.e., speed times torque, carried or transmitted by a pinion gear. Accordingly, much effort has been directed to ensuring acceptable performance and service life of planetary gear assemblies in general and planet gears subjected to high operating speeds, torques and power in particular.

Many different approaches have focused on the planet pinion gear, its mounting shaft and bearing assembly. For example, the surface finish and hardness of the pinion gear bore as well as its straightness have been improved. The profile of the pinion shaft and the end profile of the bearing needles have been optimized. Coated washers have been utilized between the planet or pinion gears and the planet gear carrier.

From the foregoing discussion, it is apparent that improvements to this technology are desirable and the present invention is so directed.

SUMMARY

The present invention provides an improved outer bearing race and thrust washer assembly for a pinion gear of a planetary gear assembly. The bearing race and thrust washer assembly are used in pairs with the bearing races disposed within the planet or pinion gear and the thrust washers disposed adjacent the end faces of the planet or pinion gear. Each assembly includes a cylindrical bearing portion having a crowned, i.e., convex, inner surface which is secured at one end to a thrust washer. The outside surface of the thrust washer includes a plurality of shallow radial channels or grooves. A plurality of oil discharge holes extend from inside the cylindrical bearing portion through the washer to the grooved surface. The convex profile of the cylindrical portion reduces local end stress that is induced by the turning moment of helical planet gears. The surface grooves on the washer act as a centrifugal pump to pull lubrication out of the needle bearing assembly. The oil film between the washer and planet gear carrier provides a hydrodynamic effect that separates these surfaces, thereby reducing wear and improving sliding friction.

Further objects, advantages and areas of applicability will become apparent from the description provided herein. It should be understood that the description and specific examples are intended for purposes of illustration only and are not intended to limit the scope of the present disclosure.]

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
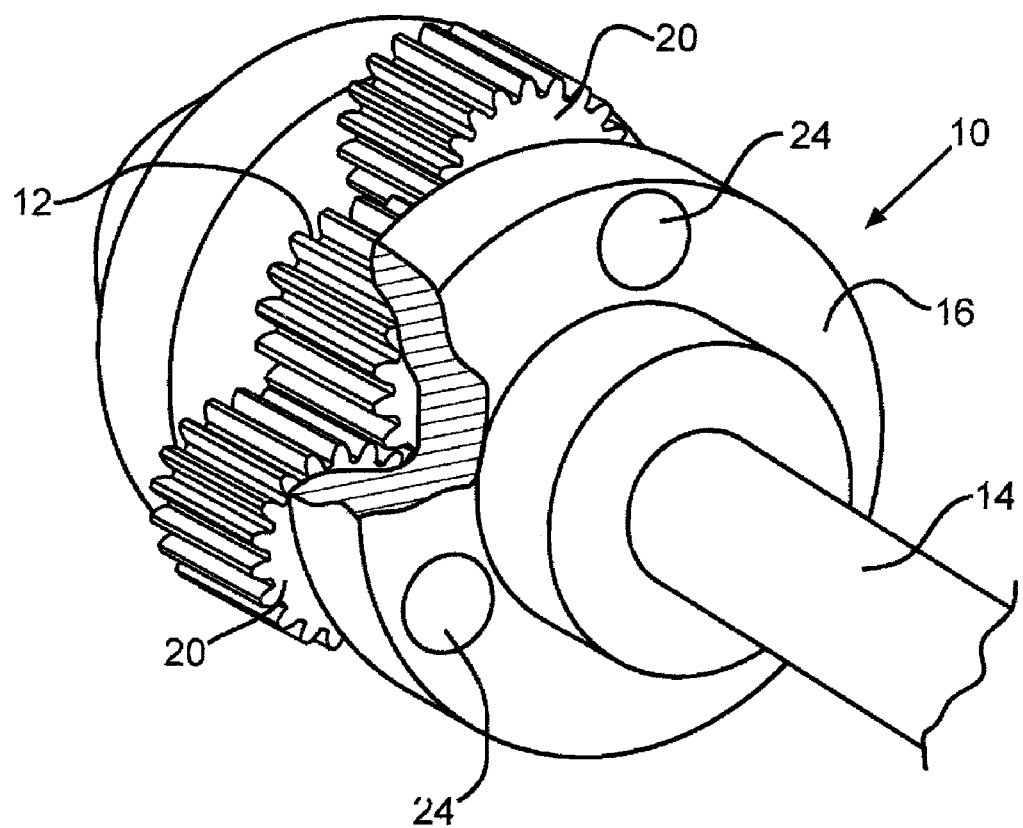
FIG. 1 is a perspective view of a planetary gear assembly with portions broken away incorporating the present invention.
Figure 2:
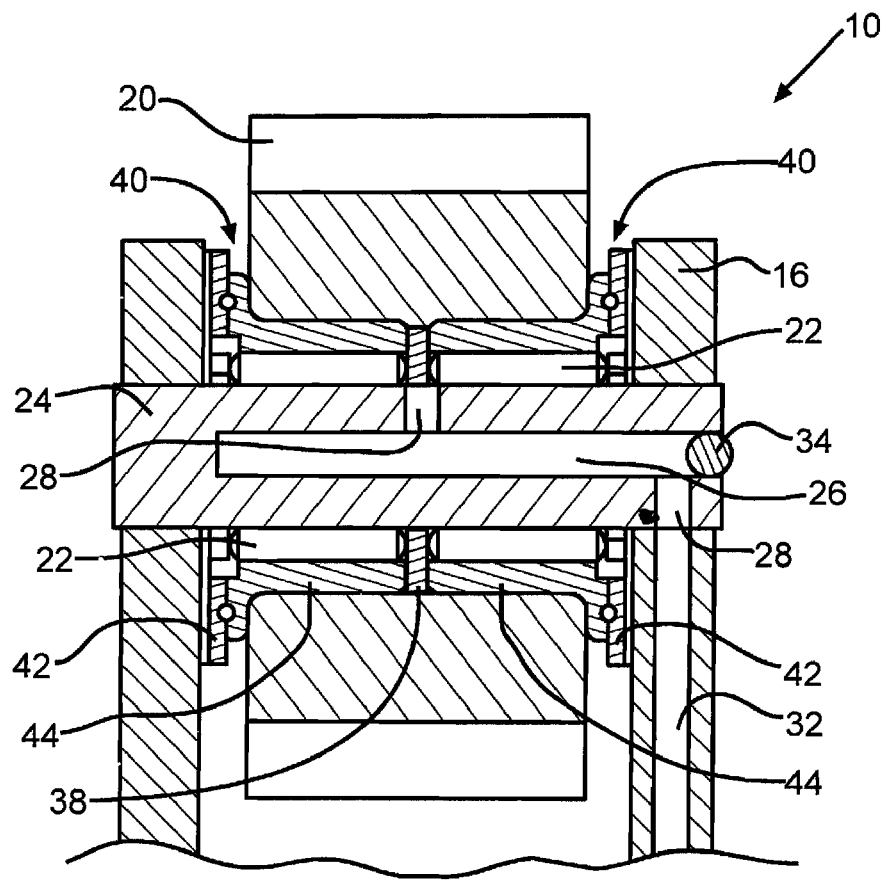
FIG. 2 is a fragmentary sectional view of a portion of a carrier of a planetary gear assembly including a planet or pinion gear and outer race and thrust washer assembly according to the present invention.

With reference now to FIGS. 1 and 2, a typical and exemplary planetary gear assembly incorporating the present invention is illustrated and generally designated by the reference number 10. The planetary gear assembly 10 includes a centrally disposed sun gear 12 which is secured to a shaft 14. Concentrically disposed about the sun gear 12 and the shaft 14 is a planet or pinion gear carrier 16. The planet gear carrier 16 positions and supports a plurality, typically three or four, planet or pinion gears 20. Typically, a ring gear (not illustrated) surrounds the planet gear carrier 16 and includes gear teeth which engage each of the planet or pinion gears 20. Each of the planet or pinion gears 20 is rotatably supported on a single or dual needle bearing assembly 22 which is, in turn, supported on a hollow stub or pinion shaft 24 which is secured to the planet gear carrier 16 by any suitable means such as, for example, staking, spot welding or an interference fit. The stub or pinion shaft 24 defines an axial lubrication passageway 26 having a pair of radial ports 28, one of which opens in the middle of the stub or pinion shaft 24 and the other of which aligns with a lubrication passageway 32 in the planet gear carrier 16. The axial lubrication passageway 26 is typically formed by drilling and thus a sealing plug or ball 34 is disposed near the end of the axial lubrication passageway 26 to close it off.

About the periphery of each of the single or dual needle bearing assemblies 22 are an opposed pair of outer race and thrust washer assemblies 40 according to the present invention. As used herein, "opposed" simply means that two of the outer race and washer assemblies 40 are arranged symmetrically or in mirror image on opposite sides of each of the planet or pinion gears 20. As illustrated in FIG. 2, if two needle bearing assemblies 22 are utilized, a separator ring or washer 38 is preferably located between the needle bearing assemblies 22 and the pair of outer race and thrust washer assemblies 40. If a single needle bearing assembly 22 is utilized, no separator ring or washer 38 is utilized and the outer race and washer assemblies 40 may abut one another.

Figure 3:
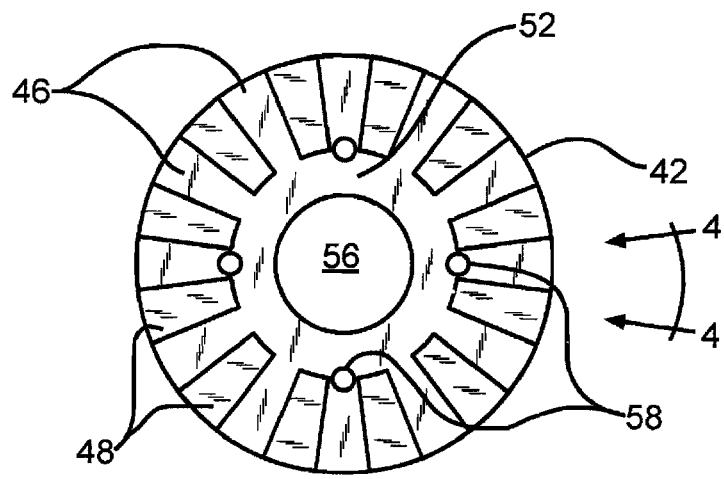
FIG. 3 is an end elevational view of an outer race and thrust washer assembly according to the present invention.

Referring now to FIGS. 2 and 3, each of the outer race and thrust washer assemblies 40 includes a larger diameter washer or disc 42 and a smaller diameter coaxial cylindrical portion 44 collectively forming what is often referred to as a "top hat" configuration. The washer or disc 42 includes a plurality of radial corrugations defined by grooves 46 interleaved with raised spokes 48. Twelve of the grooves 46 (and the raised spokes 48) have been found to provide good lubrication but it is anticipated that fewer of the grooves 46 and the spokes 48 such as, for example 6, 8 or 10 or more of the grooves 46 and the spokes 48 such as, for example, 14, 16 18 or 20 may provide good performance in other situations.

Figure 4:
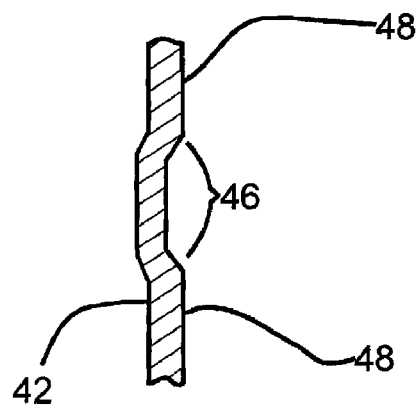
FIG. 4 is an enlarged, fragmentary, side elevational view of a thrust washer according to the present invention.

As illustrated in FIG. 4, the depth of the grooves 46 relative to the raised spokes 48 of the thrust washer or disc 42 is typically about 0.5 mm (0.0197 inches), although it is anticipated that slightly deeper or shallower grooves 46 may provide good performance in other situations and under other operating conditions. The grooves 46 merge into a recessed central circular region 52 disposed about a circular opening 56 which receives the hollow stub or pinion shaft 24. A plurality, preferably four, axial lubrication openings 58 extend through the washer or disc 42 adjacent the circular opening 56 into the interior of the coaxial cylindrical portion 44.

Figure 5:
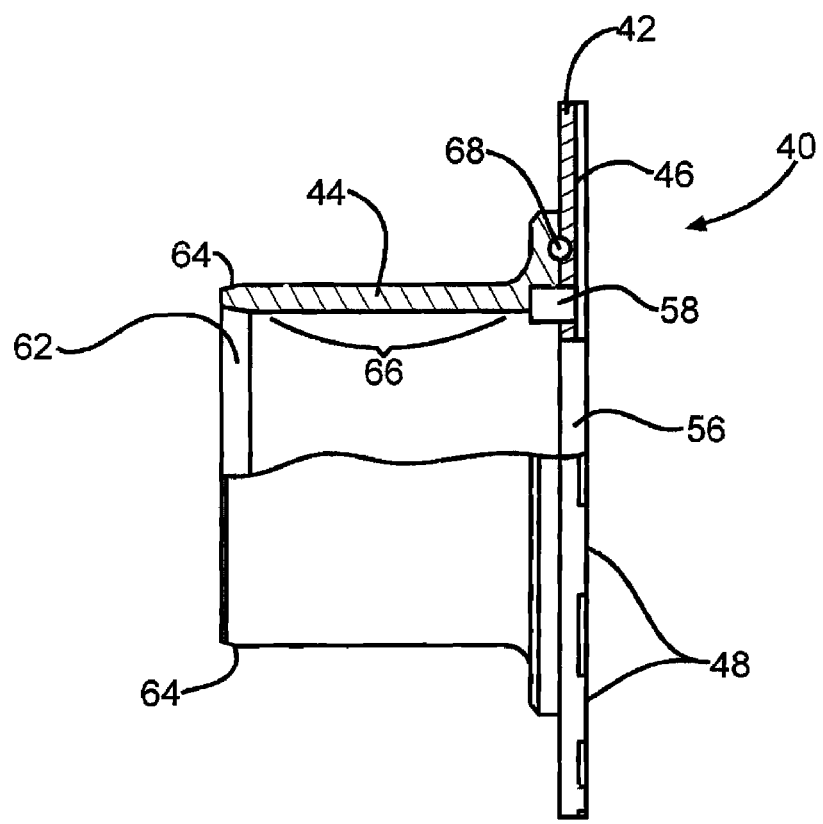
FIG. 5 is an enlarged, side elevational in half section of an outer race and thrust washer assembly according to the present invention.

Referring now to FIG. 5, the coaxial cylindrical portion 44 includes a first chamfered or oblique surface 62 on its interior at the end opposite the washer or disc 42. A second chamfered or oblique surface 64 resides on the exterior of the cylindrical portion 44 proximate the first oblique surface 62. The cylindrical portion 44 includes a curved or convex interior surface 66 wherein the ends of the convex surface 66 define a diameter just slightly greater than the diameter of the axial middle of the surface 66. Preferably, the radius of the curved or convex surface 66 is at least six or seven inches (152.4 to 177.8 mm) or more. A full convex surface 66, that is, a convex surface having a smaller diameter at its middle with large diameters at both ends is utilized, as illustrated, with dual or double needle bearing assemblies 22 and the separator ring or washer 38. When a single needle bearing assembly 22 is utilized with a planet or pinion gear 20, only the inner end if the cylindrical portion 44, that is, the end including the chamfered or oblique surfaces 62 and 64 includes the convex, larger diameter region. This curved or convex interior surface 66 reduces local end stress induced by the turning moment of the planet or pinion gears 20 if they have helical teeth.

The outer race and washer assembly 40 may be a unitary component or it may be assembled from the larger diameter washer or disc 42 and the smaller diameter coaxial cylindrical portion 44 which are spotted welded together at a plurality of welds 68, one of which is illustrated in FIG. 5.

It will be appreciated that the outer race and washer assembly 40 provides improved lubrication of the planet or pinion gears 20 of a planetary gear assembly 10. First of all, the surface grooves 46 on the washer or disc 42 act as a centrifugal pump to draw lubricating fluid through and out of the needle bearing assemblies 22. Second of all, the fluid film between the washer or disc 42 and planet carrier 16 provides a hydrodynamic effect that separates these surfaces, thereby reducing wear and improving sliding friction.

The description of the invention is merely exemplary in nature and variations that do not depart from the gist of the invention are intended to be within the scope of the invention. Such variations are not to be regarded as a departure from either the spirit or the scope of the invention or the following claims.

What is claimed is:

1. An outer race and thrust washer assembly for a pinion gear of a planetary gear assembly comprising:
   a circular disc having a plurality of radial corrugations having raised and recessed portions, a recessed circular region having an outer diameter, a center opening defining a first diameter, and a plurality of lubrication ports, wherein said center opening extends through said circular disc, said recessed circular region is disposed concentric with said center opening, said radial corrugations extend radially from said outer diameter of said recessed circular region and said plurality of lubrication ports are disposed proximate said outer diameter of said recessed circular region, and
   a cylindrical body portion extending from said circular disc having a first end fixed to the circular disc, a second end opposite the first end, an inside surface extending between said first end and said second end, and an inside diameter larger than said first diameter of said center opening, wherein the inside surface has a curved shape extending from said first end to said second end; and
   wherein said cylindrical body portion has a length approximately half the axial thickness of the pinion gear.

2. The outer race and thrust washer assembly of claim 1 wherein said plurality of radial corrugations includes between ten and twelve.

3. The outer race and thrust washer assembly of claim 1 wherein said recessed portions have a depth of about 0.5 millimeters.

4. The outer race and thrust washer assembly of claim 1 wherein said plurality of lubrication ports are circular and are four in number.

5. The outer race and thrust washer assembly of claim 1 further including a chamfered surface on an end of said cylindrical body portion opposite said circular disc.

6. An outer race and thrust washer assembly for supporting a gear comprising:
   a washer having a plurality of raised ribs interleaved with a like plurality of recessed grooves, a center opening and a plurality of lubrication ports disposed adjacent said plurality of raised ribs and said plurality of recessed grooves, and
   a cylindrical body extending from said washer, said body having a first end fixed to said washer, a second end opposite said first end, an inside diameter larger than a diameter of said center opening and an inside surface extended from said first end to said second end having a region of smaller diameter merging with a region of larger diameter, and wherein said inside surface includes a convex shape extending from said first end to said second end;
   wherein said cylindrical body has a length approximately half the axial thickness of the gear.

7. The outer race and thrust washer assembly of claim 6 wherein said plurality of radial corrugations are between ten and twelve in number.

8. The outer race and thrust washer assembly of claim 6 wherein said recessed grooves have a depth of about 0.5 millimeters.

9. The outer race and thrust washer assembly of claim 6 wherein said plurality of lubrication ports are four in number.

10. The outer race and thrust washer assembly of claim 6 further including a chamfered surface on an end of said cylindrical body opposite said washer.

11. The outer race and thrust washer assembly of claim 6 further including a recessed circular region disposed about said circular opening and merging with said recessed grooves.

12. A planetary gear carrier assembly comprising:
a planet gear carrier having a first and second annular members arranged coaxially wherein each annular member has a plurality of bores,
a plurality of stub shafts having an outer surface, a first end and a second end wherein each first end is mounted in said bores of said first annular member and each second end is mounted in said bores of said second annular member,
a plurality of needle bearing assemblies having an outer periphery, wherein two of said plurality of needle bearing assemblies are disposed on said outer surface of each of said stub shafts,
a plurality of outer race and thrust washer assemblies having an outer surface, a first end and a second end, wherein the first end includes a disc, and wherein two of the plurality of outer race and thrust washer assemblies are each disposed on said outer periphery of one of said needle bearings and wherein the second ends are proximate each other and wherein said disc having a plurality of raised radial surfaces interleaved with a plurality of recessed radial surfaces, a center opening through which passes one of said stub shafts and a plurality of ports adjacent said plurality of raised radial surfaces and said plurality of recessed radial surfaces and a cylindrical body fixed to and extending from said disc and having a convex inner surface defining a diameter larger than said center opening;
a plurality of planet gears, one of said plurality of planet gears disposed on said outer surface of said outer race and thrust washer assemblies,
a plurality of washers wherein one of said plurality of washers is disposed on each of said stub shafts between and adjacent the second ends of each of the outer race and thrust washer assemblies and the two needle bearing assemblies; and
wherein each of the pair of outer race and thrust washer assemblies have a length approximately half the axial thickness of the planet gear.

13. The planetary gear assembly of claim 12 wherein said plurality of raised radial surfaces are between ten and twelve in number.

14. The planetary gear assembly of claim 12 wherein said recessed surfaces have a depth of about 0.5 millimeters.

15. The planetary gear assembly of claim 12 wherein said plurality of ports are four in number.

16. The planetary gear assembly of claim 12 further including a chamfered surface on an end of said cylindrical body opposite said disc.

17. The planetary gear assembly of claim 12 further including a recessed circular region disposed about said center opening and joining said recessed grooves.

18. The planetary gear assembly of claim 12 wherein said outer race and thrust washer assemblies are further disposed opposite each other.

19. The planetary gear assembly of claim 12 wherein said outer race and thrust washer assemblies abut each other.

20. The planetary gear assembly of claim 12 further including a separator washer disposed on said stub shaft between each outer race and thrust washer assembly.

* * * * *